United States Patent [19]

Simoens et al.

[11] Patent Number: 5,004,773
[45] Date of Patent: Apr. 2, 1991

[54] COMPOSITIONS BASED ON VINYLIDENE FLUORIDE POLYMERS, WHICH HAVE A REDUCED SMOKE-PRODUCING CAPACITY

[75] Inventors: Anthony Simoens, Vedrin; Etienne Hannecart, Tervueren, both of Belgium

[73] Assignee: SOLVAY & Cie (Société Anonyme), Brussels, Belgium

[21] Appl. No.: 36,381

[22] Filed: Apr. 9, 1987

[30] Foreign Application Priority Data

Apr. 21, 1986 [FR] France .................. 86 05839

[51] Int. Cl.$^5$ .................. C08K 5/00
[52] U.S. Cl. .................. 524/178
[58] Field of Search .................. 524/178

[56] References Cited

U.S. PATENT DOCUMENTS

| | | | |
|---|---|---|---|
| 2,489,518 | 11/1949 | Burt | 524/178 |
| 3,063,963 | 11/1962 | Wooten et al. | 524/178 |
| 3,068,195 | 12/1962 | Anderson et al. | 524/178 |
| 4,298,702 | 11/1981 | Hahn et al. | 524/178 |
| 4,314,934 | 2/1982 | Smith et al. | 524/178 |

FOREIGN PATENT DOCUMENTS

| | | | |
|---|---|---|---|
| 0018818 | 9/1967 | Japan | 524/178 |
| 0021411 | 2/1980 | Japan | 524/178 |

OTHER PUBLICATIONS

Encyclopedia of Polymer Science and Technology, 1970, John Wiley & Sons, Inc., vol. 12, pp. 725, 737-742.
Encyclopedia of Polymer Science and Technology, 1970, John Wiley & Sons, Inc., vol. 14, pp. 565-567, 570-571.
Encyclopedia of Polymer Science and Technology, 1970, John Wiley & Sons, Inc., vol. 14, pp. 602-605.

*Primary Examiner*—Joseph L. Schofer
*Assistant Examiner*—Peter D. Mulcahy
*Attorney, Agent, or Firm*—Spencer & Frank

[57] ABSTRACT

Compositions based on vinylidene fluoride polymers, which have a reduced smoke-producing capacity, comprising, as smoke-reducing agent, an effective amount of a dialkyltin dicarboxylate.

The compositions are very particularly suitable for the manufacture of shaped articles in the building and the aeronautical industries.

9 Claims, No Drawings

COMPOSITIONS BASED ON VINYLIDENE FLUORIDE POLYMERS, WHICH HAVE A REDUCED SMOKE-PRODUCING CAPACITY

BACKGROUND OF THE INVENTION

The present invention relates to compositions based on vinylidene fluoride polymers, which have a reduced smoke-producing capacity.

Vinylidene fluoride polymers are inflammable with difficulty and are self-extinguishable. The incorporation into them, before they are used, of flame retardants such as certain specific compounds of tin, with a view to further improving their fire-resistance, has already been proposed. Nevertheless, flame retardants have generally proved to be unsuitable for preventing totally the combustion of shaped articles made of vinylidene fluoride polymers, at high temperature.

Moreover, reducing the smoke-producing capacity, i.e. the capacity to generate smoke by combustion, and ignition delay of a polymer composition are two different phenomena which are not directly related to each other, to such an extent that some flame retardant compounds act, in some cases, as smoke producers, once the combustion has effectively started, or that some smoke reducers induce, in some cases, incandescence phenomena which promote ignition.

In contrast to the generally held view, it is now known that the combustion of shaped articles made of vinylidene fluoride polymers causes smoke to be produced in a quantity sufficient to form a disadvantage as serious as the flames themselves, insofar as it makes the control of fire more difficult.

The use of molybdenum derivatives, such as metal molybdates, in order to reduce effectively the quantity of smoke emitted during the combustion of vinylidene fluoride polymers is described in French Patent FR-A-82/17,123 (SOLVAY & Cie). However, the incorporation of metal molybdates into vinylidene fluoride polymers leads to an opaquing of the shaped articles, thereby decreasing the possibilities of use in some fields of use in which a high transparency is required, such as, for example, coating electric cables.

SUMMARY OF THE INVENTION

Therefore, the object of the present invention, as characterized in the claims, is to obtain equally efficient smoke-reducing agents which make shaped articles less opaque than those in the prior art. Additionally, the compositions according to the invention have an increased fire resistance, i.e. high limit oxygen indices.

According to the invention, these compositions contain, as smoke-reducing agents, an effective amount of one or more dialkyltin dicarboxylates of general formula:

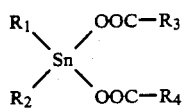

in which $R_1$ and $R_2$, which may be identical or different, represent alkyl radicals containing from 1 to 6 carbon atoms and $R_3$ and $R_4$, which may be identical or different, represent alkyl radicals containing from 8 to 20 carbon atoms.

Preference is given to dialkyltin dicarboxylates of which the alkyl radicals $R_1$ and $R_2$ are identical and contain from 3 to 5 carbon atoms and of which the alkyl radicals $R_3$ and $R_4$ are identical and contain from 10 to 16 carbon atoms. A very particularly preferred dialkyltin dicarboxylate is dibutyltin dilaurate.

The quantity of dialkyltin dicarboxylate (hereinafter called "organotin derivative") present in the compositions according to the invention may vary to a great extent, especially depending on the result aimed at and on the nature of the organotin derivative used. The organotin derivative is usually used at a rate of 0.02–2 parts by weight, expressed as total metallic tin, per 100 parts of vinylidene fluoride polymer. It is preferably used at a rate of 0.05 to 1 part and, more particularly still, of 0.10 to 0.50 part by weight in total, expressed as metallic tin, per 100 parts of polymer.

In addition to the organotin derivative, the compositions according to the invention may contain all the common additives for vinylidene fluoride polymers, such as stabilizers, filler substances, pigments, flame retardants, polymeric additives, lubricants, and the like. A significant advantage of the smoke-reducing agents according to the invention lies in the fact that they have lubricating properties, so that the addition of a commonly added lubricating agent, such as a polyolefin wax, becomes unnecessary. The exclusion of a commonly added lubricating agent further substantially improves the transparency of the resulting shaped articles. In general, the compositions according to the invention contain at least 65% by weight of one or more vinylidene fluoride polymers and, most frequently, at least 80% by weight of such polymers.

The term "vinylidene fluoride polymers" is meant to denote all polymers containing at least 85 mole %, and, preferably, at least 90 mole % of monomer units derived from vinylidene fluoride. Thus, the vinylidene fluoride polymers which are suitable for preparing the compositions according to the invention comprise the homopolymers of vinylidene fluoride as well as its copolymers containing monomeric units derived from one or more comonomers. Particularly advantageous results are obtained with vinylidene fluoride polymers containing at least 90 mole % of monomeric units derived from vinylidene fluoride, the balance, when present, preferably consisting of monomeric units derived from other fluorinated olefins, such as vinyl fluoride, trifluoroethylene, chlorotrifluoroethylene, tetrafluoroethylene and hexafluoropropylene.

The preparation of the compositions according to the invention does not present any particular problem, it being possible to use all the usual techniques for the preparation of these compositions. Thus, the organotin derivative may be mixed with the vinylidene fluoride polymer as early as the polymerization stage, either by introducing it directly into the polymerization medium at the end of polymerization, or alternatively by adding it to the wet cake obtained by draining or filtering the aqueous dispersion from the polymerization. A particularly advantageous procedure consists in adding the organotin derivative to the vinylidene fluoride polymer while preparing a pre-mixture, along with the other additives which form part of the composition. The organotin derivative may also be introduced directly into the equipment in which the vinylidene fluoride polymer is melted, such as the screw-type extrusion apparatus.

The compositions according to the invention are suitable for use in all the conventional processes for the conversion of thermoplastics. They are particularly suitable for the manufacture of shaped articles intended for use in the fields of application of vinylidene fluoride polymers in which a significant reduction in the smoke-producing capacity combined with a high transparency of the shaped articles is particularly useful, such as in the building and aeronautical industries (tubes, sheaths, films and paints). The compositions according to the invention are very particularly suitable for the manufacture of sheath for electric cables. For the latter application, preference is given to vinylidene fluoride copolymers containing up to 10 mole % of monomeric units derived from other fluorinated olefins.

DESCRIPTION OF THE PREFERRED EMBODIMENTS

The examples which follow illustrate the invention without, however, limiting it.

The formulations evaluated in Examples 1 and 2, according to the invention, and 4 and 5, by reference, have the following composition, the quantities being expressed by weight:

| Vinylidene fluoride polymer | 100 |
|---|---|
| Polyethylene wax | 0.2 |
| Smoke-reducing additive | see Table I |

The formulation evaluated in Example 3 according to the invention does not contain polyethylene wax.

In all examples, the polymer is a copolymer of vinylidene fluoride containing 10% by weight of monomeric units derived from a fluorinated olefin of trade mark SOLEF and of type 11010, produced and marketed by SOLVAY & Cie.

Compositions 1 to 5 were prepared by mixing all the ingredients and kneading the mixture at 180° C. for 5 minutes, after which plates are pressed by pressing the crepe at 180° C. for 2 minutes at a pressure of 98 bars. Plates were also prepared, under the same conditions, from a formulation without the smoke-reducing additive, which formulation contained 0.2 part of polyethylene wax per 100 parts of vinylidene fluoride polymer (reference).

The determination of the smoke-producing capacity was carried out using test-pieces cut off from the pressed plates, at 650° C., at an air flow rate of 300 litres/hour, according to the valid French standard NF T51-073 of September 1977. From each of the pressed plates, three test-pieces were cut off, their mass being determined in a preliminary trial so that the maximum optical density does not exceed 2.5 during the combustion test.

For each of the test-pieces, the optical density versus time curve was recorded. From these curves, the following were defined:

the conventional unit for the quantity of smoke U, viz. the quantity of smoke which corresponds to an optical density of 1 for a period of 1 minute; and the total quantity of smoke emitted during the trial, S, expressed in conventional units.

From these data, the smoke index F, F being equal to S/m, m being the mass of the test-piece expressed in g, was calculated for each of the test-pieces, and the mean value for the three test-pieces was worked out.

The smoke reduction, expressed as %, was then calculated according to the formula:

$$\frac{F - F_o}{F_o} \times 100, \text{ in which}$$

F = mean smoke index for the sample tested $F_o$ = mean smoke index for a reference sample without smoke-reducing additive. The mean smoke index $F_o$ for the formulation based on the SOLEF 11010 copolymer without smoke-reducing additive is 5.94.

The nature and the quantity of smoke-reducing additive used, smoke reduction for each composition, i.e. the decrease in smoke, expressed as %, relative to the reference composition, and the limit oxygen index (LOI) are given in Table I in the annex.

The results relating to the opacity ("haze"), determined according to the ASTM D1003 standard, of films extruded at 240° C., with a thickness of 200 microns, from compositions according to Examples 1 and 3, Comparative Example 5 and from the reference composition are given in Table II in the annex.

A comparison of the results for the Examples according to the invention 1, 2 and 3 with those for the Comparative Examples 4 and 5 shows that, at a smoke-reducing capacity equivalent to that of calcium molybdate, the smoke-reducing agents according to the invention have the advantage of opaquing shaped objects made of vinylidene fluoride polymers to a lesser extent.

TABLE I

| No. of Example | Smoke-reducing additive | | | Smoke reduction % | LOI |
|---|---|---|---|---|---|
| | Nature | Quantity in pcr* | in g of metal/ 100 g | | |
| 1 | Dibutyltin dilaurate | 0.6 | 0.112 | 58 | 62.5 |
| 2 | Dibutyltin dilaurate | 1.8 | 0.336 | 70 | N.D.** |
| 3 | Dibutyltin dilaurate | 0.6 | 0.112 | 58 | 62 |
| 4 | Calcium molybdate | 0.2 | 0.096 | 58 | 58.2 |
| 5 | Calcium molybdate | 0.6 | 0.288 | 76 | N.D. |

*parts by weight per 100 parts of resin
**N.D. = not determined

TABLE II

| | Opacity of films |
|---|---|
| | Cloudiness, % (ASTM standard D 1003) |
| Reference composition | 63 |
| Composition according to Example 1 | 69 |
| Composition according to Example 3 | 52 |
| Composition according to Example 4 | 74 |

We claim:

1. Compositions based on vinylidene flouride polymers, which have a reduced smoke-producing capacity, characterized in that they contain, as smoke-reducing agent, an effective amount of dialkyltin dicarboxylate of general formula:

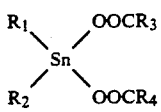

in which $R_1$ and $R_2$, which may be identical or different, represent alkyl radicals containing from 1 to 6 carbon atoms and $R_3$ and $R_4$, which may be identical or different, represent alkyl radicals containing from 8 to 20 carbon atoms; and wherein the polymers comprise at least 90 mole percent of vinylidene fluoride.

2. Compositions according to claim 1, characterized in that the alkyl radicals $R_1$ and $R_2$ are identical and contain from 3 to 5 carbon atoms and in that the alkyl radicals $R_3$ and $R_4$ are identical and contain from 10 to 16 carbon atoms.

3. Compositions according to claim 1, characterized in that the dialkyltin dicarboxylate is dibutyltin dilaurate.

4. Compositions according to any one of claim 1, characterized in that the dialkyltin dicarboxylate is used at a rate of 0.02 to 2 parts by weight, expressed as metallic tin, per 100 parts of vinylidene fluoride polymer.

5. Compositions according to claim 4, characterized in that the dialkyltin dicarboxylate is used at a rate of 0.05 to 1 part by weight, expressed as metallic tin, per 100 parts of vinylidene fluoride polymer.

6. Compositions according to claim 1, characterized in that the vinylidene fluoride polymer is a vinylidene fluoride homopolymer.

7. Compositions according to any one of claim 1, characterized in that the vinylidene fluoride polymer is a copolymer of vinylidene fluoride.

8. Compositions based on a vinylidene fluoride polymer, which have a reduced smoke-producing capacity, characterized in that the vinylidene fluoride polymer is a copolymer of vinylidene fluoride containing at least 90 mole percent of vinylidene fluoride, and that it contains as a smoke-reducing agent an effective amount of dialkyltin dicarboxylate of general formula:

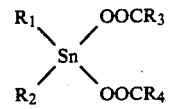

in which $R_1$ and $R_2$, which may be identical or different, represent alkyl radicals containing from 1 to 6 carbon atoms and $R_3$ and $R_4$, which may be identical or different, represent alkyl radicals containing from 8 to 20 carbon atoms, and wherein the polymer has a reduced smoke-producing capacity at the combustion temperature of the polymer.

9. The method of reducing the smoke-producing capacity of vinylidene fluoride polymers, comprising the step of adding as a smoke-reducing agent an effective amount of dialkyltin dicarboxylate of general formula:

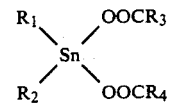

in which $R_1$ and $R_2$, which may be identical or different, represent alkyl radicals containing from 1 to 6 carbon atoms and $R_3$ and $R_4$, which may be identical or different, represent alkyl radicals containing from 8 to 20 carbon atoms.

* * * * *